Figure 1:
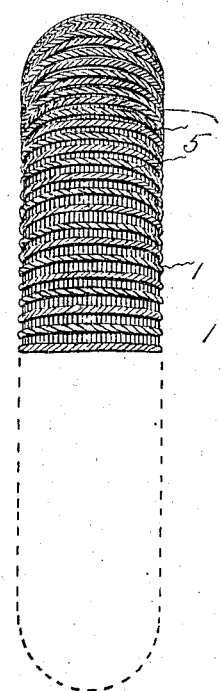

W. F. HAAS.
AUTOMOBILE TIRE.
APPLICATION FILED DEC. 29, 1910.

1,063,196.

Patented June 3, 1913.

Witnesses:
F. H. Elliott
Josephine M. Strempfer

Inventor:
William F. Haas,
by Harry P. Williams
atty.

UNITED STATES PATENT OFFICE.

WILLIAM F. HAAS, OF HARTFORD, CONNECTICUT.

AUTOMOBILE-TIRE.

1,063,196. Specification of Letters Patent. Patented June 3, 1913.

Application filed December 29, 1910. Serial No. 599,975.

*To all whom it may concern:*

Be it known that I, WILLIAM F. HAAS, a citizen of the United States, residing at Hartford, in the county of Hartford and State of Connecticut, have invented a new and useful Improvement in Automobile-Tires, of which the following is a specification.

This invention relates to a tire or tire shoe which is formed mainly of a knitted fabric.

Various styles of woven fabrics for reinforcing tires and shoes have been proposed. The tire shoes in common use, have, embedded in the rubber for imparting strength, one or more layers of canvas or the like woven fabric, usually cut on the bias from a flat web and formed with abutting or overlapping edges into a ring. It is difficult to stretch such a fabric, when it is hard woven, so that it will have the required concavo-convex annular form. If the edges abut, there are localities having less strength than the remainder of the tire, and if the edges are overlapped, there are places of greater thickness of fabric and less of rubber, and consequently the body does not have uniform strength of reinforcing material to prevent blow-outs. In such tires there is not an absolutely uniform thickness of rubber, and furthermore canvas and the like hard woven fabric is not yielding and flexible and does not readily and evenly absorb or become penetrated by the rubber when the tire is made.

It has been suggested that the reinforcement for the rubber of a tire or shoe may be made from a tubular knitted fabric that is slitted longitudinally, but such is weak at the edges, for, cutting the tubular knitted fabric in this manner severs the warp threads into many short lengths, rendering the edges unmanageable and liable to fray out. It has also been proposed to reinforce a tire or shoe with a fabric knitted flat and of varying thickness, in order that the sections supposed to be subjected to the greatest strain in use will have the most strength, but such reinforcement must be put together with overlapping ends, which results in a variable thickness and non-uniform strength. It has also been proposed to knit a tubular covering, which after being formed into a circle, has its ends telescoped and secured by stitching. This necessitates undue stretching of the outer part of the tube in order that the inner part may be tight, which results in a loss of strength and durability and causes a variable thickness.

The object of this invention is to overcome these objections and form a very resilient, yet strong and durable tire or shoe, which is light in weight, thereby producing at a less cost than the present tire or shoe, one having equally desirable if not better qualities. This end is attained, according to this invention, by forming a tire or shoe of one or more layers of endless circular webs, built one upon the other and impregnated with suitable cement or rubber until the required thickness of tire or shoe is obtained. These webs are knitted in annular shape of a diameter a little less than the diameter of the finished article, and of a width approximately equal to the peripheral length of the cross section of the tire. They may be knitted in a continuous tube on a circular machine having the desired diameter, and the tube may be cut across the web in suitable widths to form the several layers. When cut in this manner across the web or transversely of the knitting, the warp thread is cut but once on each side so that the edges will be strong and manageable, and have no tendency to fray out. This method provides a body which is very flexible yet tough and durable. Such a circular body, without lap or seam, is easily stretched to the desired form and is capable of readily and uniformly absorbing the cementing material or rubber. And the edges, which are not weakened so that they will loosen and fray by reason of the severing of the warp threads into short lengths, can be easily and strongly secured to the fastening wires or rings provided for assisting in securing the tire or shoe in place on the wheel. Furthermore, when the body is formed of several superposed layers of such a fabric, as the ribs or the chain of the knitting stitch run transversely of the tire, if the layers are reversed with relation to each other, the knitting ribs interlock and prevent one layer from stretching and loosening itself from the other. Such a body as this may have wires or other rings fastened in its edges, and after being stretched upon an expansible former, which is used to give it the required shape, it is impregnated with the cementing material and held in this manner until the cementing material has solidified to the desired degree.

In the accompanying drawings, the views are illustrative only in a general way, and are not drawn to exact scale on account of the nature of the material forming the structure.

Figure 2:
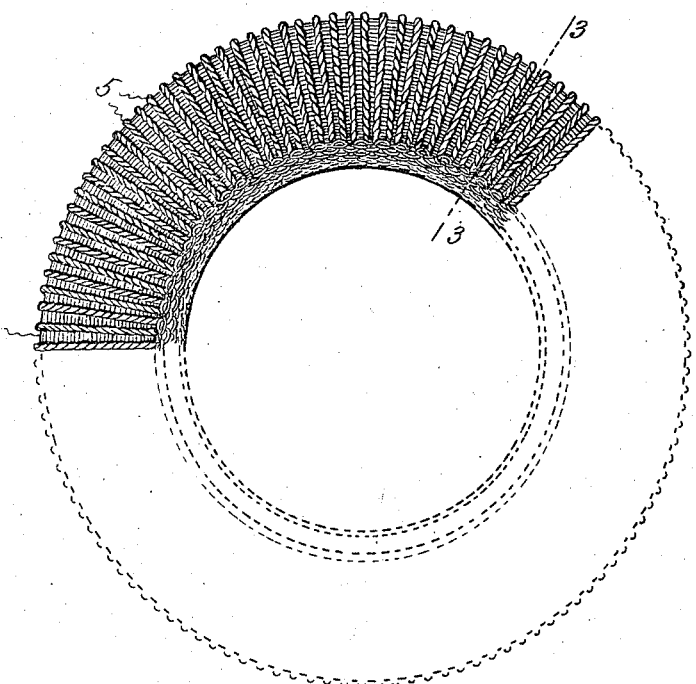
Figure 4:
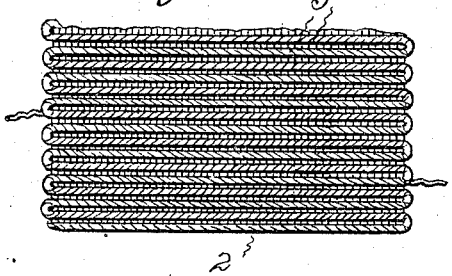
Figure 3:
Figure 5:
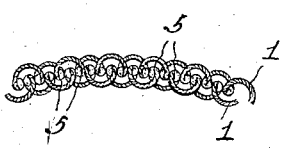

Figure 1 shows an edge view of a portion of a tire shoe which embodies the invention, before the fabric is provided with the cementing compound. Fig. 2 shows a side view of the same. Fig. 3 shows a transverse section of the same. Fig. 4 shows a portion of a strip of the knitted fabric used to build up the body of the shoe according to this invention. Fig. 5 shows a longitudinal section of a short length of two layers of knitted fabric put together according to a preferred manner of practising the invention, the knitting stitches being opened for the purpose of illustration.

In forming a tire or shoe according to this invention, one or more circular webs 1 of approximately the diameter of the wheel, are knitted of one or more strands, yarns, or warp threads (preferably cotton), on a common form of knitting machine of the required size. These circular webs, having approximately the diameter of the wheel, which are endless and without seam, are knit to the desired width of each strip, as is the short section 2 of strip shown in Fig. 4, or the knitting may be proceeded with to produce a tube of any desired length, and this tube may be cut transversely to produce the strips of the desired width. The width of these strips is equal to the length of the periphery 3 of the cross section of the tire or shoe with enough added to wrap about the fastening wires 4. When formed in this manner, either by knitting to the exact width, or by severing a knitted tube transversely into pieces of the exact width, the warp yarn or thread is severed but once on each side. Knitting in this manner results in the production of a circular, endless and seamless web of approximately the diameter of the tire, with the ribs 5 or chain of the knitting stitch extending transversely of the strip, as shown in Fig. 4, and with finished uncut edges. Several of such circular, endless and seamless webs are superposed upon a form and stretched out to the desired finished diameter. Stretching the fabric in this manner causes the chain ribs, which extend transversely, to separate from each other so that the chain ribs of the different layers will interlock when the webs are superposed. The webs formed in this manner have a greater capacity for stretching on the outside periphery and contracting along the inner edges than webs formed in any other manner, that is, with the chain or ribs running longitudinally around the tire. After sufficient number of layers of circular webs have been built up to give the required thickness of body, they are impregnated with the desired cementing material which may be rubber, a compound of rubber, or other material. Either before or after the cementing material is applied, preferably before, the edges are secured to the wire rings 4 in any desired manner, in order to provide annular flanges which may be utilized for fastening the tire or shoe in place upon the wheel in the common manner. When the cementing material is suitably solidified, the tire or shoe is removed from the former and is ready for use.

This method of forming a tire of superposed layers of endless, circular webs or webs without lap or seam cemented together, produces a tire or shoe that is much more flexible, stronger and tougher than one containing bias cut canvas. The circular knit web affords more protection against a blowout than a bias cut canvas or a flat knitted web having abutting or overlapping edges, or a circular knitted web cut longitudinally and having its edges fastened together. Such a reinforcement as this allows the rubber or other cement to penetrate the material much more than is possible with canvas or any woven material. This tough yet elastic body which is uniform in thickness and without lap or seam and has firm edges and is thoroughly permeated with the cementing compound, being very flexible as well as tough, is quite light, yet has great wearing qualities. Beside producing a tire having these desirable qualities, this method is comparatively simple, resulting in a relatively cheap tire.

The invention claimed is:

A tire or shoe comprising superposed layers of endless, circular, knitted bands, each without lap or seam, said bands being formed of a continuous thread or yarn knitted in a circle of a diameter substantially the same as the diameter of the tire or shoe, and having the ribs or chain of the knitting stitch extending transversely of the bands, whereby the threads or yarns are not severed at the edges of the bands, and a resilient cementing compound impregnating the superposed bands.

WILLIAM F. HAAS.

Witnesses:
JOSEPHINE M. STREMPFER,
H. R. WILLIAMS.